US006922827B2

(12) United States Patent
Vasilik et al.

(10) Patent No.: US 6,922,827 B2
(45) Date of Patent: Jul. 26, 2005

(54) ITERATIVE SOFTWARE DEVELOPMENT ENVIRONMENT WITH PRIORITIZED BUILD RULES

(75) Inventors: Kenneth Eric Vasilik, Redmond, WA (US); David Bau, III, Gladwyne, PA (US); Roderick A. Chavez, Kirkland, WA (US)

(73) Assignee: BEA Systems, Inc., San Jose, CA (US)

( * ) Notice: Subject to any disclaimer, the term of this patent is extended or adjusted under 35 U.S.C. 154(b) by 717 days.

(21) Appl. No.: 10/082,795

(22) Filed: Feb. 22, 2002

(65) Prior Publication Data

US 2003/0163799 A1 Aug. 28, 2003

(51) Int. Cl.⁷ .............................................. G06F 9/45
(52) U.S. Cl. ..................................................... 717/140
(58) Field of Search ............................... 717/140–149; 707/1, 3, 100, 101

(56) References Cited

U.S. PATENT DOCUMENTS

| | | | | |
|---|---|---|---|---|
| 5,778,231 A | * | 7/1998 | van Hoff et al. ............. | 717/143 |
| 5,937,188 A | * | 8/1999 | Freeman ..................... | 717/104 |
| 6,035,120 A | | 3/2000 | Ravichandran | |
| 6,279,151 B1 | * | 8/2001 | Breslau et al. .............. | 717/140 |
| 6,286,134 B1 | | 9/2001 | Click, Jr. et al. | |
| 6,314,559 B1 | | 11/2001 | Sollich | |
| 6,370,682 B1 | | 4/2002 | Eckardt et al. | |
| 6,438,745 B1 | | 8/2002 | Kanamaru et al. | |
| 6,463,579 B1 | * | 10/2002 | McKinsey ................... | 717/146 |
| 6,526,570 B1 | | 2/2003 | Click, Jr. et al. | |
| 6,546,549 B2 | | 4/2003 | Li | |
| 6,622,300 B1 | * | 9/2003 | Krishnaswamy et al. ... | 717/130 |
| 6,654,952 B1 | * | 11/2003 | Nair et al. .................. | 717/157 |
| 6,694,290 B1 | * | 2/2004 | Apfelbaum et al. ......... | 703/22 |

OTHER PUBLICATIONS

Beetem et al. Incremental Scanning and Parsing with Galaxy. IEEE. 1991. pp. 641–651.*
Tessier et al. Incremental Compilation for Parallel Logic Verification Systems. IEEE. 2002. pp. 623–636.*
Rice et al. ADA 95 and Software Reuse. IEEE. 1997.*
Zhang et al. PA–RISC to IA–64: Transparent Execution, No Recompilation. IEEE. 2000. pp. 47–52.*
Enterprise Build Management, "A White Paper and Technical Overview of Openmake," Catalyst Systems Corporation, 2001, pp. 1–11.
"Customer Support Newsletter," Lucent ® nmake: Newsletter No. 7, Jan. 31, 2001, http://www.bell-labs.com/project/nmake/newsletters/issue007.html, pp. 1–12.

* cited by examiner

*Primary Examiner*—Wei Y. Zhen
(74) *Attorney, Agent, or Firm*—Schwabe, Williamson & Wyatt, P.C.

(57) ABSTRACT

An iterative software development environment is provided to perform modified dependency analyses for use in building a target file and all the files on which it depends from one or more source files using a set of prioritized build rules. In one embodiment, the build rules indicate how different types of target files can be generated from different source file types. A given target file type may be associated with several rules, each having a different priority, for building the target from different source file types. In one embodiment, if more than one source file exists that can be used to generate a given target file, the rule with the highest priority is used. In one embodiment, the build environment identifies how to generate a particular target file by identifying the highest priority rule for which an associated source file type exists. Moreover, the development environment identifies the presence of a new source file having a corresponding build rule with a higher priority than that of the source file type(s) previously used in the generation of the target file. In one embodiment of the invention, the target file is rebuilt if such a new source file is identified, or if one or more source files previously used to build the target file are determined to have been modified more recently than that indicated by the build date/time of the target file itself.

36 Claims, 7 Drawing Sheets

ITERATIVE SOFTWARE DEVELOPMENT ENVIRONMENT WITH PRIORITIZED BUILD RULES

BACKGROUND OF THE INVENTION

1. Field of the Invention

The present invention generally relates to the field of software development environments. More specifically, the present invention relates to an environment for iterative software development in which targets can be built from any one of a prioritized list of source files.

2. Background Information

With software companies struggling to beat one another to market with the "latest and greatest" software products and technologies, the need for reduced development times has never been greater. During a typical software development lifecycle, a software development team may go through the steps of analysis, design, construction, and testing before the resulting software application may be successfully deployed. Often times, developers are required to perform numerous iterations of code construction, modification and testing of a design before the product can be deployed. It is often useful for the developer to view and test the results of each incremental software change as it is completed before proceeding to the next change. However, in compiled language environments, the process of rebuilding, deploying and testing complex software projects can be tedious and time consuming. When a large number of iterations is required, the accumulated build and deploy time becomes significant, possibly delaying the release of the software product in a business where short development times are necessary in order to remain competitive.

Accordingly, a number of mechanisms have been employed to speed software generation by reducing development time. For example, integrated development environments (IDE) provide developers with various software development tools for tasks such as editing, compiling, debugging, and so forth. Although IDEs may simplify software development, it is useful to provide iterative software development capabilities at a lower-level, so they are available both inside the IDE and from the command line, where some experienced programmers prefer to work without the overhead often accompanied with IDEs.

Advanced compilers have also been introduced that automate the analysis of complex dependencies between source files in a software project, and that rebuild the minimum subset of the project based on which source files have changed. However, these compilers only work for a single type of source file (e.g., C++ or Java), must be manually activated each time compilation is needed and don't have any way to rapidly determine whether rebuild is needed without performing a dependency analysis.

Therefore, further improvements in the area of iterative software development are desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
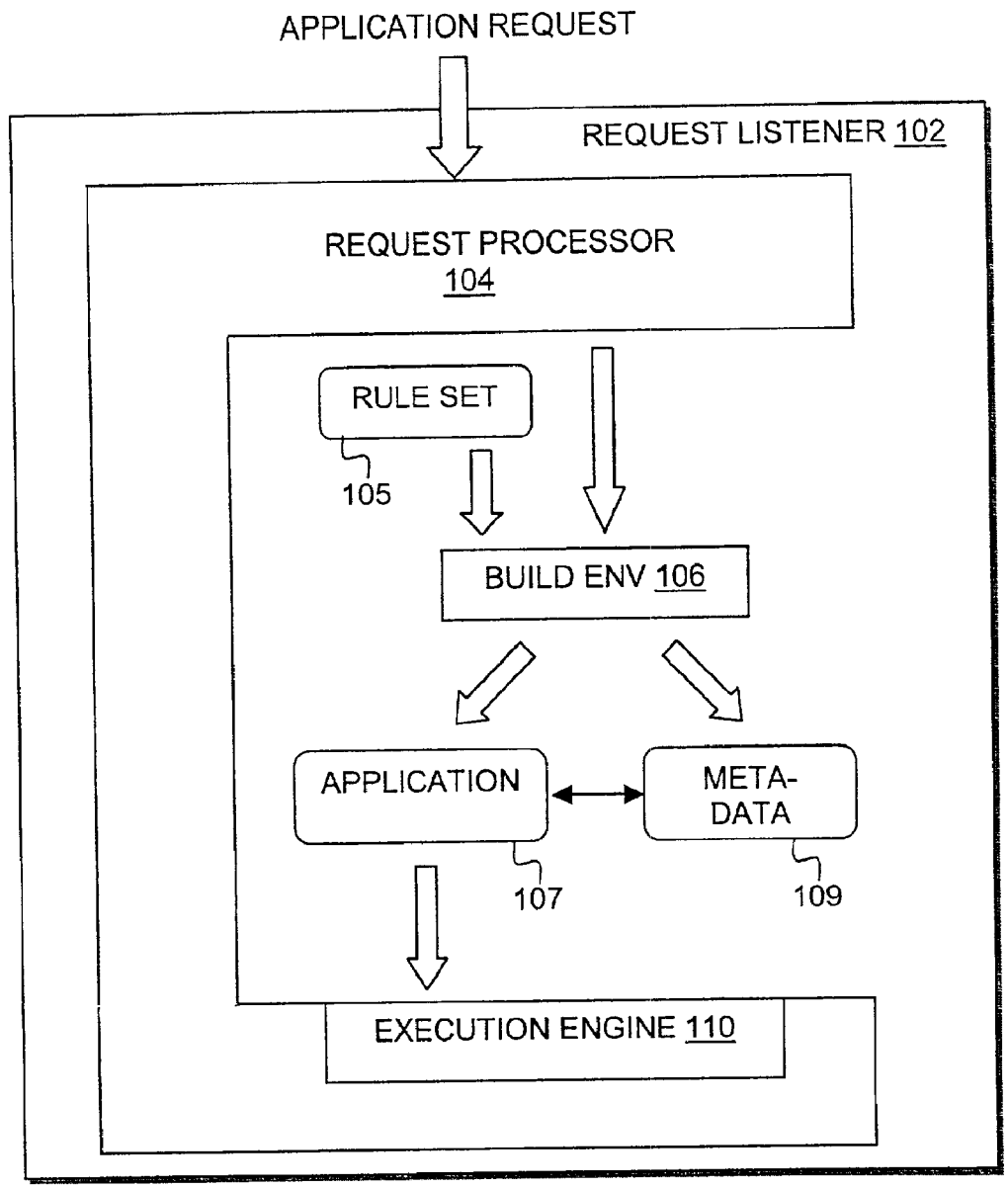
FIG. 1 is a block diagram illustrating one embodiment of the present invention.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as receiving, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

The present invention may be advantageously employed to reduce iterative software development cycles. In one embodiment of the invention, a build environment is provided to perform modified dependency analyses for use in building an application and all the files on which it depends from one or more source files using a set of prioritized build rules. In one embodiment, the build rules indicate how different types of target files can be generated from different source file types (e.g., a ".class" file can be built from a ".java" file using the java compiler). A given target file type may be associated with several rules, each having a different priority, for building the target from different source file types. In one embodiment, if more than one source file exists that can be used to generate a given target file, the rule with the highest priority is used. In one embodiment, the build environment identifies how to generate a particular target file by identifying the highest priority rule for which an associated source file type exists. Moreover, the build environment identifies the presence of a new source file having a corresponding build rule with a higher priority than that of the source file type(s) previously used in the generation of the target file. In one embodiment of the invention, the target file is rebuilt if such a new source file with a higher priority is identified, or if one or more source files previously used to build the target file are determined to have been modified more recently than that indicated by the build date/time of the target file itself.

FIG. 1 is a block diagram illustrating one embodiment of the present invention. In FIG. 1 request processor 104 is equipped to receive application requests provided via request listener 102. Request listener may be e.g., an interactive command shell, a graphical operating system, an HTTP server, etc. Request listener 102 verifies that requests are syntactically valid based upon e.g. the configuration and capabilities of request processor 104. In one embodiment of the invention, request processor 104 determines whether an application exists within a designated search path to satisfy the request. In one embodiment of the invention, if an application corresponding to the received request does not exist within a designated search path, request processor 104 invokes build environment 106 to automatically generate such an application without further human interaction. Accordingly, a developer can be freed from having to manually initiate the build process in response to one or more error conditions that would otherwise have been returned by the prior art.

To build the requested application, request processor 104 invokes build environment 106 passing the name of the application as the build target. Build environment 106 represents a build environment advantageously modified with the teachings of the present invention to perform modified dependency analysis during the generation of a target file. During the modified dependency analysis process, build environment 106 finds the source file associated with the target using a designated source path and examines the external dependencies (e.g., via well-known variable type analysis techniques) of the source file to identify external target files on which the source file depends. The source path is used to find source files to build targets while the search path is used to find requested applications. In some environments, the source path may be the same as the search path or it may differ from the search path. In turn, build environment 106 recursively examines the dependencies of each external target file, until all external dependencies are identified (i.e., the transitive closure of application dependencies).

In accordance with one embodiment of the invention, as build environment 106 recursively identifies all external dependencies of the original target file, build environment 106 builds missing target files using prioritized build rules within rule set 105 and populates two data structures, named rebuildIfNewer and rebuildIfExists, with meta-data 109, to record the list of dependencies. In one embodiment, rule set 105 describes a prioritized list of candidate rules, one for each source file type that can be used to generate the target file. In one embodiment, the prioritized list of rules is sorted by priority. The rule priorities may be assigned by a developer depending upon the functionality enabled by each source file type and the desired functionality for the target file. Of course, the set of rules can be arranged in any order so long as the relative priority of each rule is preserved. In one embodiment, build environment 106 iterates through each of the rules in rule set 105 associated with the current target type in priority order. For each rule, build environment 106 determines whether the rule can be used to build the target file by searching the source path for a source file of the type required by the rule and a name matching that of the target file. If an appropriate source file is found, the rule is used to build the target, and the source file location (name and path) is stored within the rebuildIfNewer data structure before the rule search ends. However, if an appropriate source file is not found, the expected source file location (name and path) is stored within the rebuildIfExists data structure, and the rule search process continues with the next highest priority rule. This process continues until a rule has been identified for building each required target file from the set of available source files. If the build process cannot determine an appropriate rule to build one of the required target files, the build process exits with an error. Once application 107 is generated, build environment 106 associates metadata 109, including the rebuildIfNewer and rebuildIfExists data structures containing dependencies, with application 107 and passes application 107 to execution engine 110 for execution. In one embodiment, application 107 contains a reference to the location of metadata 109, whereas in an alternative embodiment, metadata 109 is itself embedded within application 107. In one embodiment metadata 109 is stored in persisted data structures. By storing the metadata in data structures that are persisted, the metadata can be used in association with subsequent rebuilds of the application without requiring the build environment to perform additional dependency analyses, thereby expediting the build process and further decreasing the development time.

The above description is based upon the assumption that the requested application did not exist within a designated search path. However, in accordance with one embodiment of the invention, if it is determined that an application corresponding to the request does exist, request processor 104 makes a determination based upon one or more criteria, as to whether a rebuild of the application is needed prior to the application being executed. In one embodiment, a determination as to whether a rebuild of the application is needed is based upon whether the source files listed in the rebuildIfNewer data structure of meta-data 109 have been modified more recently than the most recent build date/time of the application. In one embodiment, the build date/time of each source file listed in the rebuildIfNewer data structure is compared against the most recent application build date/time, and if any of the corresponding source files have a date/time that is more recent than the application build date/time, the application is rebuilt. Similarly, in one embodiment a search of the designated source path is performed to determine if any source files listed in the rebuildIfExists data structure of meta-data 109 (i.e. those source files having a higher priority than the source files used to build the application) now exist in the designated source path. If so, a rebuild of the application is automatically triggered.

Figure 2:
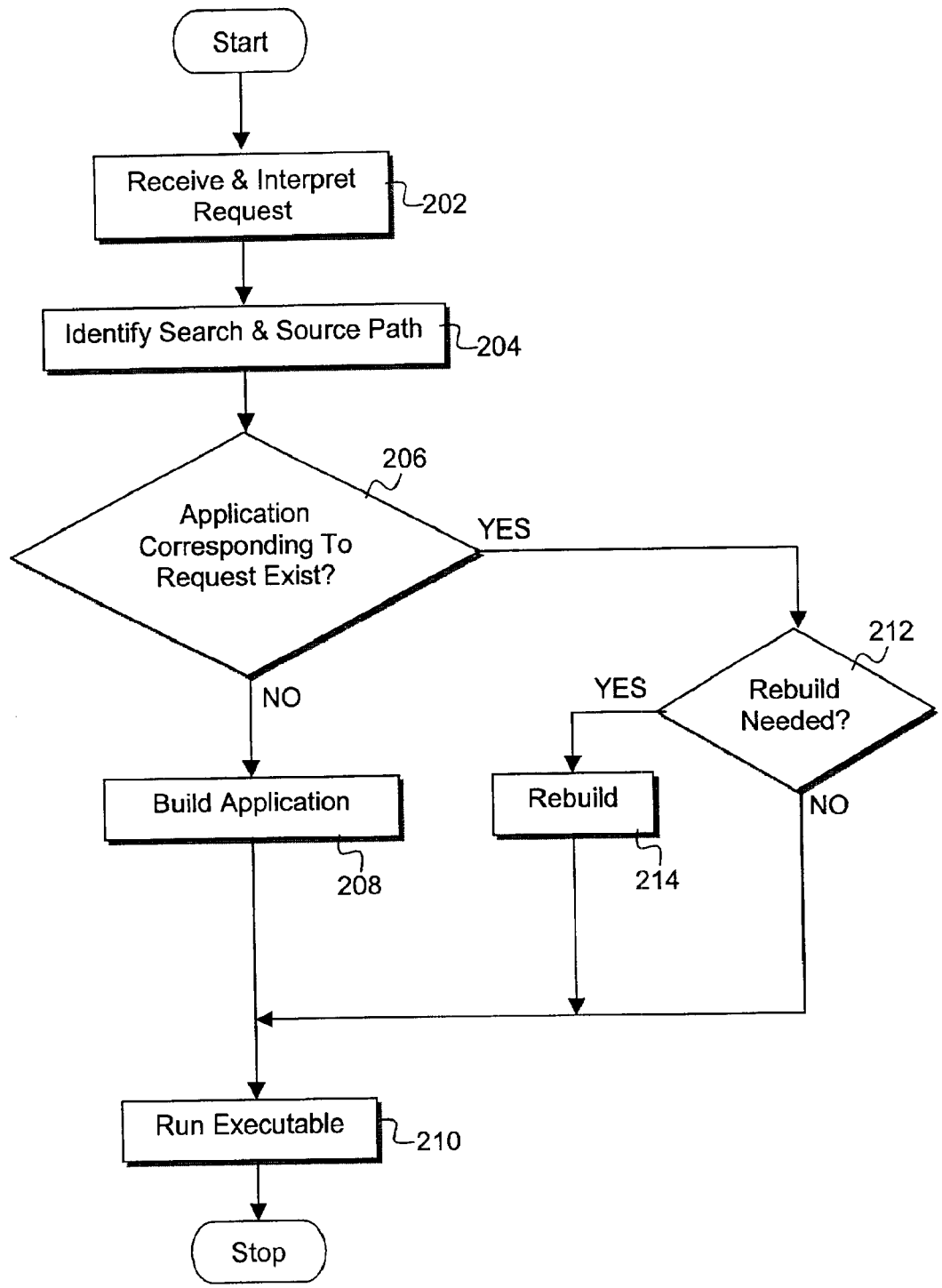
FIG. 2 is a flow diagram illustrating an overview of an application generation/regeneration process in accordance with one embodiment.

FIG. 2 is a flow diagram illustrating an overview of an application generation/regeneration process in accordance with one embodiment. To begin, a request is received and interpreted e.g. by request listener 102, (block 202). In accordance with the teachings of the present invention, the request can assume numerous forms including but not limited to that of a command entered directly by a user through a command line interface, or that of one or more data packets received from a remote client via a network connection. Next, a search path and source path are identified for locating the application and various source files to be used in generating the application respectively (block 204). In one embodiment, the request is an HTTP based message identifying a URL that identifies the location of meta-data used to derive the search and source paths. Next, a determination is made as to whether an application corresponding to the request exists within the search path (block 206). If the application is not present within the search path, the build environment proceeds to build the application (block 208), which is eventually executed (block 210). However, if the application is present within the search path, a further determination is made regarding whether a rebuild of the application is needed (block 212). If so, the application is rebuilt (block 214) and then executed (block 210). If a rebuild of the application is not needed (block 212), the existing application is merely executed (block 210) without being rebuilt.

Figure 3:
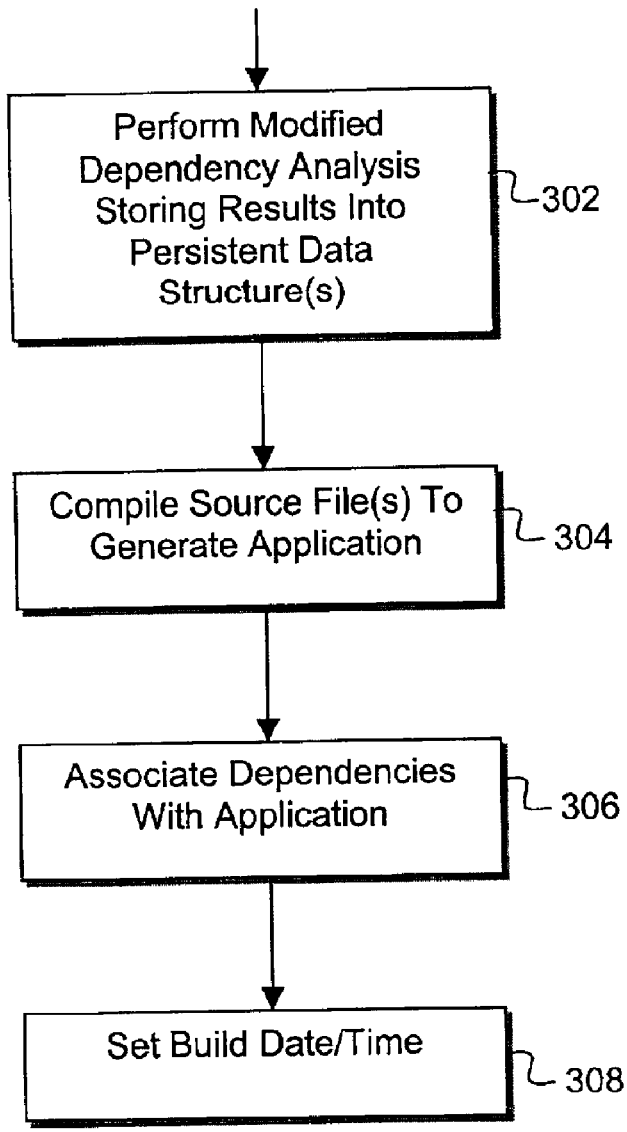
FIG. 3 is a flow diagram illustrating a more detailed view of the build process of FIG. 1, in accordance with one embodiment.

FIG. 3 is a flow diagram illustrating one embodiment of the build process of FIG. 1. To begin, build environment 106 performs a modified dependency analysis in which dependencies are stored into two data structures, named rebuildIfNewer and rebuildIfExists, that are persisted (302). In one embodiment, the rebuildIfNewer data structure is a list used to identify which source files were last used to build the application, whereas the rebuildIfExists data structure is a list used to identify source files having a greater priority than those source files used to build the application (i.e. those source files appearing in the rebuildIfNewer array) (block 304). After the modified dependency analysis has been performed, one or more source files (as e.g. determined through the dependency analysis) are compiled to generate the application (block 304). Once the application has been generated, the dependencies stored in each of the lists are associated with the application (block 306), such that the dependencies can be recalled at a later time without requiring build environment 106 to recursively open and analyze the source files again after the initial dependency analysis. In one embodiment, the dependencies stored in each of the lists are stored as metadata within the application. At the end of the build process, a system build date/time is stored with meta-data 109 to reflect the time at which the application was last built (block 308).

Figure 4:
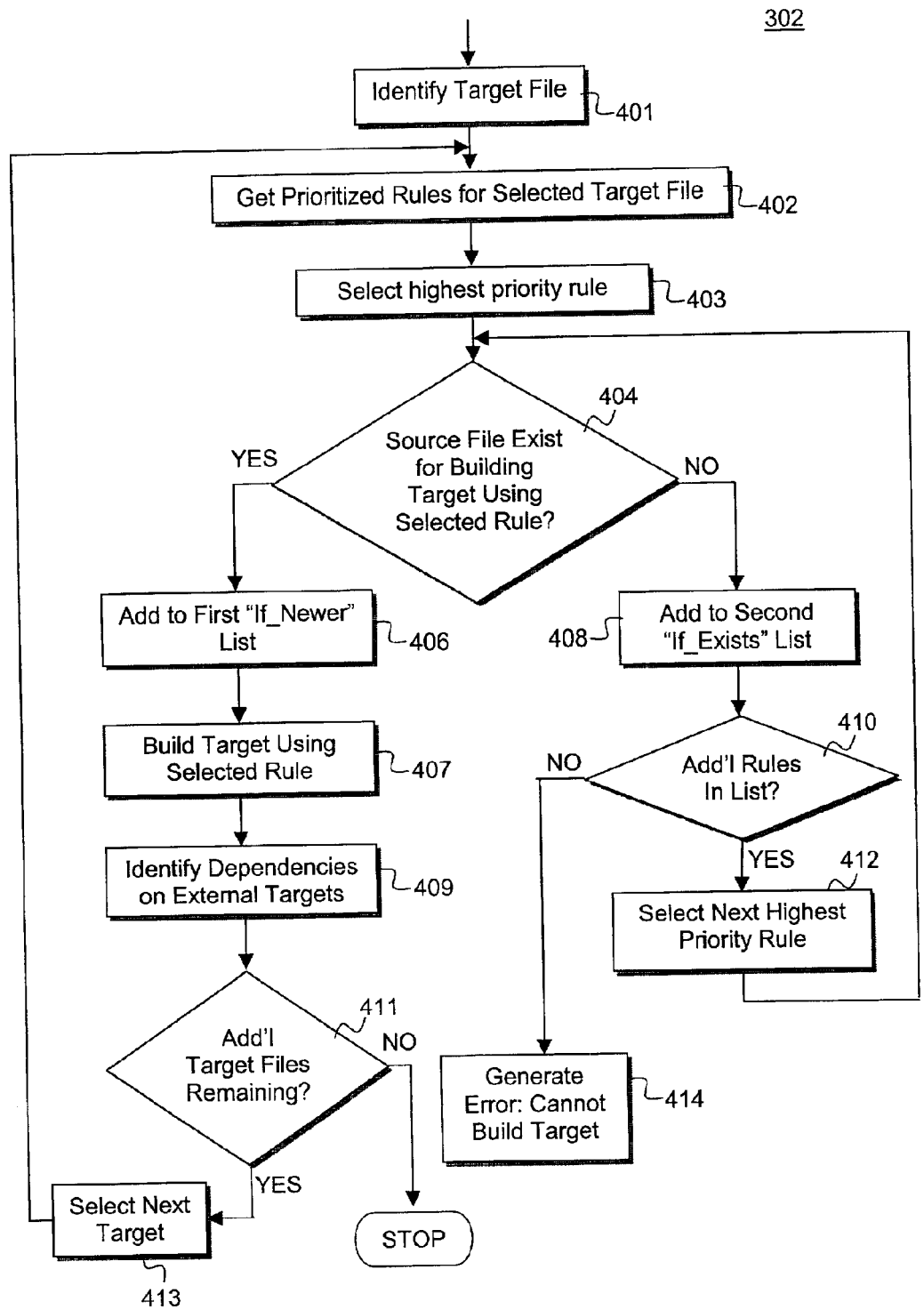
FIG. 4 illustrates a more detailed view of the modified dependency analysis process of FIG. 3, in accordance with one embodiment.

FIG. 4 illustrates a more detailed view of the modified dependency analysis process of FIG. 3, in accordance with one embodiment. To begin, build environment 106 identifies the requested target file to be built (block 401). Build environment 106 then accesses prioritized rule set 105 to retrieve prioritized rules for building the requested target file based on the target file type (block 402). In one embodiment, build environment 106 iterates through the list of rules in priority order to identify the highest priority rule that can be used to build the target file based on the existence of a source file of the type associated with the rule (block 403). For each rule, build environment 106 determines whether a source file exists for building the target using that rule (block 404). If so, the source file location (name and path) is stored into the rebuildIfNewer data structure (block 406), the target is built using the selected rule (block 407), and dependencies on external targets are then determined (block 409). If there are additional target files remaining to be built (block 411), another target is selected (block 413) and the process repeats. However, if all target files have been built, including the application, the build process completes successfully.

If the source file required to build the target with the selected rule does not exist (block 404), the expected location (name and path) of the missing source file is stored into the rebuildIfExists data structure (block 408). If there are additional rules remaining in rule set 105 that have not been selected (block 410), the rule with the next highest relative priority (i.e. the highest priority remaining) is selected and the process continues (block 412). If no rules are remaining, the build process terminates and generates an error indicating it was not able to build the requested target using the rules provided and available source files (block 414). In one embodiment, this process continues until all external dependencies are identified and built or the build environment identifies a target that cannot be built.

Figure 5:
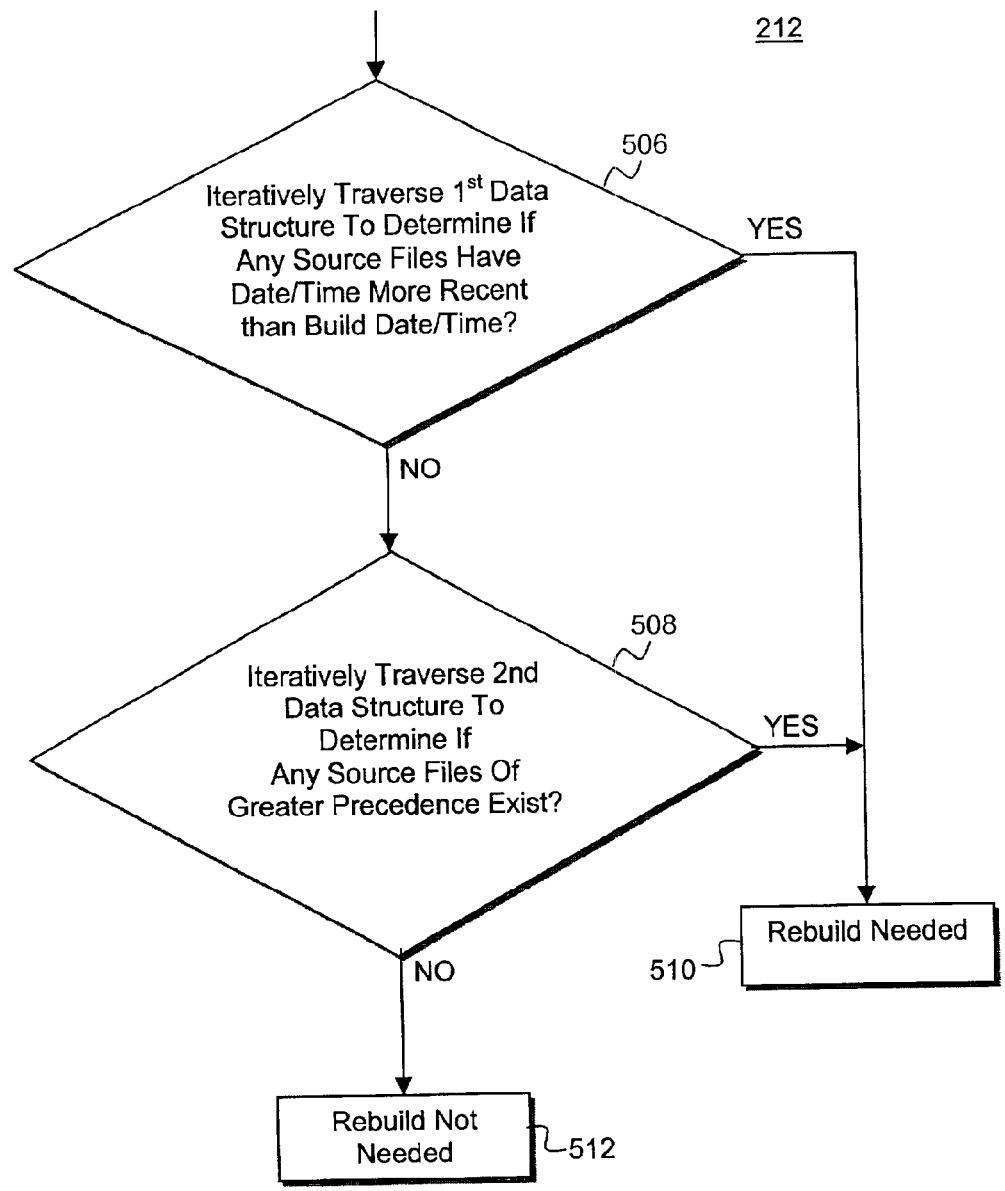
FIG. 5 illustrates one embodiment of the process used to determine whether a rebuild of the application is needed.

FIG. 5 illustrates one embodiment of the process used to determine whether a rebuild of the application is needed. In determining whether a rebuild of the application is necessary, the rebuildIfNewer data structure is iteratively traversed to determine if any of the modification dates/times of the source files identified in the rebuildIfNewer data structure are more recent than the system build date/time (block 506). If the answer is "no", then the rebuildIfExists data structure is iteratively traversed and a determination is made as to whether any of the source files identified by the rebuildIfExists data structure are present within a designated source path (block 508). If none of the source files identified by the rebuildIfExists data structure are present within a designated source path, then a rebuild is not needed (block 512). However, if any of the modification dates/times of the source files identified in the rebuildIfNewer data structure are more recent than the system build date/time, or if any of the source files identified by the rebuildIfExists data structure are present within a designated source path, then a rebuild is needed (block 510).

EXAMPLE APPLICATION

Figure 6:
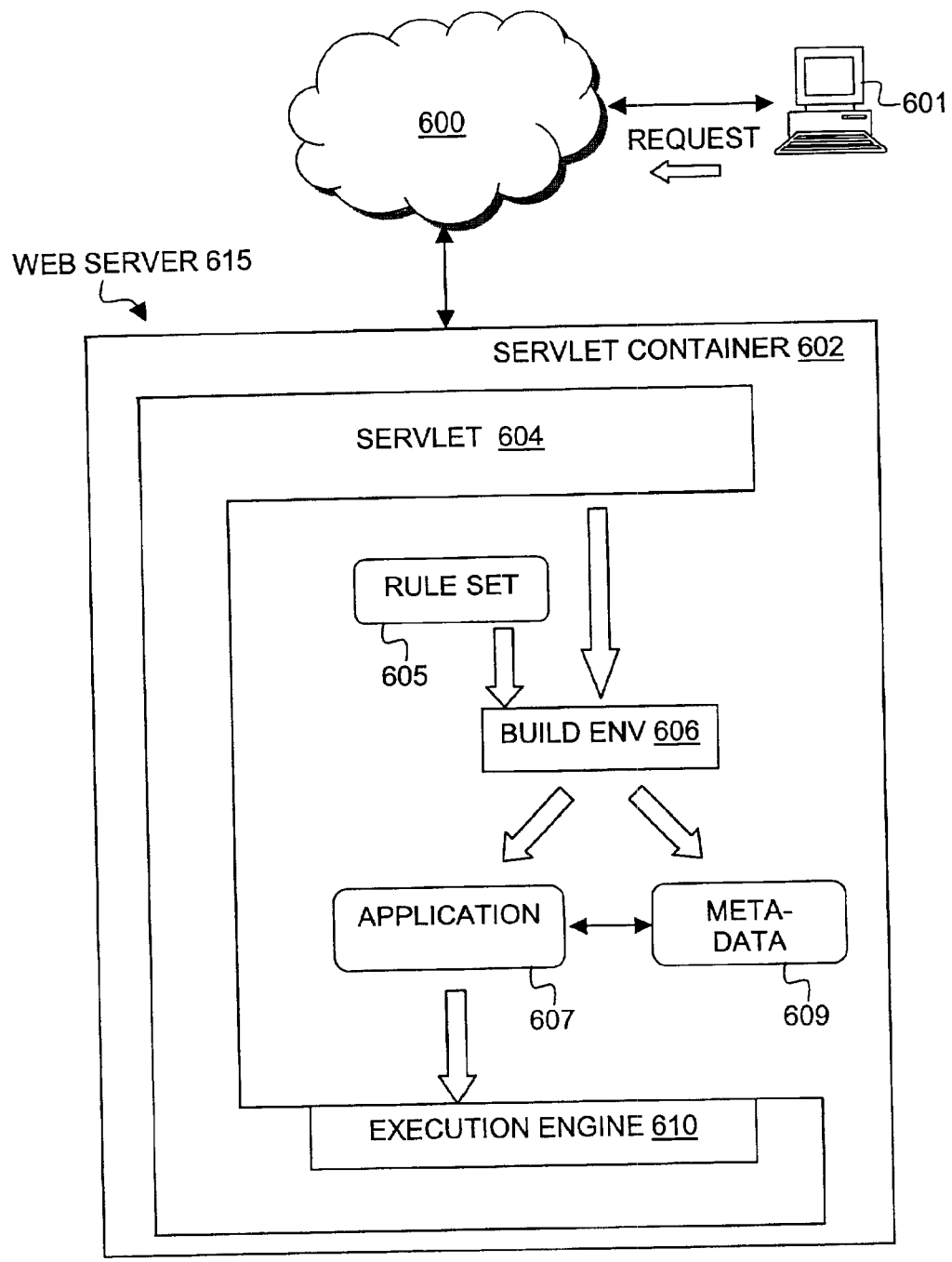
FIG. 6 is a block diagram illustrating an alternative embodiment of the present invention.

FIG. 6 is a block diagram illustrating one embodiment of the present invention. In FIG. 6, remote client 601 sends HTTP based requests over network 600 to web server 615, incorporating the teachings of the present invention. Web server 615 represents a host of one or more Java based web services that are made publicly accessible to remote clients such as client 601. In one embodiment, the request provides a URL that indicates a publicly accessible resource on web server 615. In one embodiment, the URL is used to identify the name of an application used to implement the web service of the illustrated embodiment and a deployment descriptor containing a search path and source path.

In one embodiment, the request is received by servlet container 602 and processed by servlet 604. In one embodiment, servlet 604 represents a servlet designed to receive web service requests and parse the requests to identify the application required to respond to the request. In one embodiment, servlet 604 determines whether an application corresponding to the indicated URL exists within the search path and dispatches the request according to the result. For example, if a corresponding application does exist within the search path, servlet 604 first determines whether the application needs to be rebuilt as described above (see e.g. FIG. 5). If the application does not need to be rebuilt, servlet 604 dispatches the application to execution engine 610 whereupon it is executed. However, if the application does need to be rebuilt, servlet 604 provides the name of the application to build environment 606, which then proceeds with the build process. Likewise, if the application does not exist within the search path, servlet 604 provides the name of the application to build environment 606 to generate an application, which is then automatically executed.

EXAMPLE HOST COMPUTER SYSTEM

Figure 7:
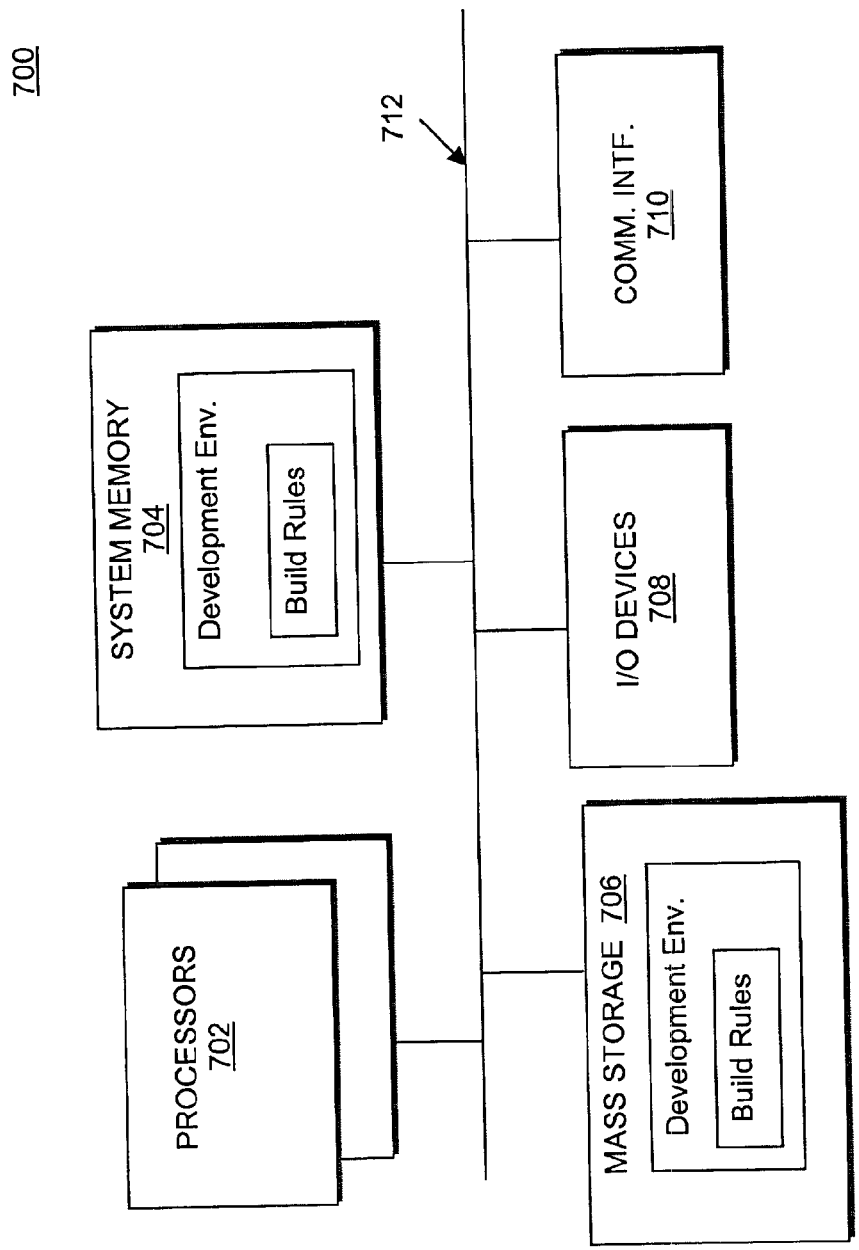
FIG. 7 illustrates an example computer system suitable for practicing the present invention.

FIG. 7 illustrates an example computer system suitable for hosting the software development environment of the present invention. As shown, computer system 700 includes one or more processors 702, and system memory 704. Additionally, computer system 700 includes mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown). Each of these elements performs its conventional functions known in the art. In particular, system memory 704 and mass storage 706 are employed to store a working copy and a permanent copy of the programming instructions implementing the present invention. The permanent copy of the programming instructions may be loaded into mass storage 706 in the factory, or in the field, through e.g. a distribution medium (not shown) or through communication interface 710 (from a distribution server (not shown). The constitution of these elements 702-712 are known, and accordingly will not be further described Conclusion and Epilogue Thus, it can be seen from the above description, an environment for iterative software development with prioritized build rules has been described. While the present invention has been described referencing the illustrated and above enumerated embodiments, the present invention is not limited to these described embodiments. Numerous modification and alterations may be made, consistent with the scope of the present invention as set forth in the claims to follow. Thus, the above-described embodiments are merely illustrative, and not restrictive on the present invention.

What is claimed is:

1. A method comprising:

receiving a request identifying an application;

determining whether the application corresponding to the request is present within a designated search path;

generating the application based upon automatic compilation of one or more source files, if it is determined that the application is not present within the designated search path;

determining whether regeneration of the application is needed if it is determined that the application is present within the designated search path; and regenerating the application based upon automatic compilation of the one or more source files, if it is determined that regeneration is needed.

2. The method of claim 1, wherein the one or more source files correspond to one or more prioritized source file types specified in an ordered set of compilation rules.

3. The method of claim 1, wherein generating the application comprises:

identifying a target file corresponding to the application;

accessing an ordered set of compilation rules associated with the identified target file, each of the ordered set of compilation rules identifying a target file type and a corresponding source file type for use in generating the associated target file;

selecting a compilation rule from the ordered set of compilation rules;

determining whether a source file corresponding to the source file type of the selected compilation rule exists within a designated source path for building the identified target file;

building the identified target file based upon the selected compilation rule if it is determined that the source file exists within the designated source path; and, updating a build date/time associated with the application.

4. The method of claim 3, wherein if a source file corresponding to the source file type of the selected compilation rule exists within the designated source path, a representation of the source file is stored in a first persistent data structure, and wherein if a source file corresponding to the source file type of the selected compilation rule does not exist within the designated source path, a derived source file representation is stored in a second persistent data structure.

5. The method of claim 4, wherein the representation of the source file comprises a file name and path associated with the corresponding source file.

6. The method of claim 4, wherein determining whether regeneration of the application is needed comprises determining if any source files corresponding to members of said first persistent data structure have a date/time more recent than the build date/time of the application.

7. The method of claim 6, wherein regenerating the application comprises automatically compiling source files corresponding to members of said first persistent data structure that have a date/time that is more recent than the build date/time of the application.

8. The method of claim 4, wherein determining whether regeneration of the application is needed comprises determining if any members of said second persistent data structure are present within said designated source path.

9. The method of claim 4, wherein at least one of the first and second persistent data structures comprises a list.

10. The method of claim 3, wherein the source path and the search path are equivalent.

11. The method of claim 1, wherein the request is received through a network connection as one or more data packets.

12. A method comprising:

identifying a target file corresponding to an application identified by a request;

accessing an ordered set of compilation rules associated with the identified target file, each of the ordered set of compilation rules identifying a target file type and a corresponding source file type for use in generating the associated target file;

selecting a compilation rule from the ordered set of compilation rules; and determining whether a source file corresponding to the source file type of the selected compilation rule exists within a designated source path for building the identified target file, wherein if a source file corresponding to the source file type of the selected compilation rule exists within a designated source path, a representation of the source file is stored in a first persistent data structure, and wherein if a source file corresponding to the source file type of the selected compilation rule does not exist within the designated source path, a derived source file representation is stored in a second persistent data structure.

13. The method of claim 12, further comprising:

receiving a request identifying an application, wherein said application corresponds to said identified target file;

determining whether the application is present within a designated search path; and automatically compiling the application based at least in part upon the contents of said first and second persistent data structures and in accordance with said ordered set of compilation rules, if it is determined that the application is not present within the designated search path.

14. The method of claim 13, wherein the source path and the search path are equivalent.

15. The method of claim 13, further comprising:
determining if regeneration of the application is needed if it is determined that the application is present within the designated search path;
regenerating the application if it is determined that regeneration is needed; and
updating a build date/time associated with the application.

16. The method of claim 15, wherein determining whether regeneration of the application is needed comprises determining if any source files corresponding to members of said first persistent data structure have a date/time more recent than the build date/time of the application.

17. The method of claim 15, wherein determining whether regeneration of the application is needed comprises determining if any members of said second persistent data structure are present within said designated source path.

18. The method of claim 12, wherein at least one of said first and second persistent data structures comprise a list.

19. An article of manufacture comprising:
a storage medium having stored therein a plurality of programming instructions, which when executed operate to
receive a request identifying an application;
determine whether the application corresponding to the request is present within a designated search path;
facilitate generation of the application based upon automatic compilation of one or more source files, if it is determined that the application is not present within the designated search path;
determine whether regeneration of the application is needed if it is determined that the application is present within the designated search path; and
facilitate regeneration of the application based upon automatic compilation of the one or more source files, if it is determined that regeneration is needed.

20. The article of claim 19, wherein the one or more source files correspond to one or more prioritized source file types specified in an ordered set of compilation rules.

21. The article of claim 19, wherein the instructions to facilitate generation the application comprise instructions to
identify a target file corresponding to the application;
access an ordered set of compilation rules associated with the identified target file, each of the ordered set of compilation rules identifying a target file type and a corresponding source file type for use in generating the associated target file;
select a compilation rule from the ordered set of compilation rules;
determine whether a source file corresponding to the source file type of the selected compilation rule exists within a designated source path for building the identified target file;
facilitate building of the identified target file based upon the selected compilation rule if it is determined that the source file exists within the designated source path; and
update a build date/time associated with the application.

22. The article of claim 21, wherein if a source file corresponding to the source file type of the selected compilation rule exists within the designated source path, a representation of the source file is stored in a first persistent data structure, and
wherein if a source file corresponding to the source file type of the selected compilation rule does not exist within the designated source path, a derived source file representation is stored in a second persistent data structure.

23. The article of claim 22, wherein the representation of the source file comprises a file name and path associated with the corresponding source file.

24. The article of claim 22, wherein the instructions to determine whether regeneration of the application is needed comprise instructions to determine if any source files corresponding to members of said first persistent data structure have a date/time more recent than the build date/time of the application.

25. The article of claim 24, wherein the instructions to regenerate the application comprise instructions to facilitate automatic compilation of source files corresponding to members of said first persistent data structure that have a date/time that is more recent than the build date/time of the application.

26. The article of claim 22, wherein determining whether regeneration of the application is needed comprises determining if any members of said second persistent data structure are present within said designated source path.

27. The article of claim 22, wherein at least one of the first and second persistent data structures comprises a list.

28. The article of claim 21, wherein the source path and the search path are equivalent.

29. The article of claim 19, wherein the request is received through a network connection as one or more data packets.

30. An article of manufacture comprising:
a storage medium having stored therein a plurality of programming instructions, which when executed operate to
identify a target file corresponding to an application identified by a request;
access an ordered set of compilation rules associated with the identified target file, each of the ordered set of compilation rules identifying a target file type and a corresponding source file type for use in generating the associated target file;
select a compilation rule from the ordered set of compilation rules; and
determine whether a source file corresponding to the source file type of the selected compilation rule exists within a designated source path for building the identified target file,
wherein if a source file corresponding to the source file type of the selected compilation rule exists within a designated source path, a representation of the source file is stored in a first persistent data structure, and
wherein if a source file corresponding to the source file type of the selected compilation rule does not exist within the designated source path, a derived source file representation is stored in a second persistent data structure.

31. The article of claim 30, wherein the instructions further comprise instructions to
receive a request identifying an application, wherein said application corresponds to said identified target file;
determine whether the application is present within a designated search path;
facilitate automatic compilation of the application based at least in part upon the contents of said first and second persistent data structures and in accordance with said ordered set of compilation rules, if it is determined that the application is not present within the designated search path; and update a build date/time associated with the application.

32. The article of claim 31, wherein the source path and the search path are equivalent.

33. The article of claim 31, wherein the instructions further comprise instructions to determine if regeneration of the application is needed if it is determined that the application is present within the designated search path; and facilitate regeneration of the application if it is determined that regeneration is needed.

34. The article of claim 33, wherein the instructions to determine whether regeneration of the application is needed further comprise instructions to determine if any source files corresponding to members of said first persistent data structure have a date/time more recent than the build date/time of the application.

35. The article of claim 33, wherein the instructions to determine whether regeneration of the application is needed further comprise instructions to determine if any members of said second persistent data structure are present within said designated source path.

36. The article of claim 30, wherein at least one of said first and second persistent data structures comprise a list.

* * * * *